United States Patent
Tisch et al.

(10) Patent No.: US 12,167,211 B2
(45) Date of Patent: Dec. 10, 2024

(54) MULTI-MICROPHONE NOISE FLOOR MITIGATION

(71) Applicant: GoPro, Inc., San Mateo, CA (US)

(72) Inventors: Erich Tisch, San Francisco, CA (US); Eric Steven Penrod, Brentwood, CA (US); Timothy Dick, San Francisco, CA (US); Mark Hardin, Santa Rosa, CA (US); Hakim Mesiwala, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 153 days.

(21) Appl. No.: 17/940,805

(22) Filed: Sep. 8, 2022

(65) Prior Publication Data

US 2024/0089653 A1    Mar. 14, 2024

(51) Int. Cl.
*H04R 3/00* (2006.01)
*H04R 1/02* (2006.01)
*H04R 1/40* (2006.01)
*H04R 3/04* (2006.01)

(52) U.S. Cl.
CPC ............ *H04R 3/005* (2013.01); *H04R 1/028* (2013.01); *H04R 1/406* (2013.01); *H04R 3/04* (2013.01); *H04R 2410/01* (2013.01); *H04R 2499/11* (2013.01)

(58) Field of Classification Search
CPC .......... H04R 1/406; H04R 3/005; H04R 3/04; H04R 1/028; H04R 2410/01; H04R 2499/11; H04R 2410/03; H04R 2410/05
USPC ........................ 381/94.1–94.3, 94.5, 94.7, 98
See application file for complete search history.

(56) References Cited

U.S. PATENT DOCUMENTS

| | | | |
|---|---|---|---|
| 9,002,036 B2* | 4/2015 | Harney | H04R 1/245 381/357 |
| 9,008,323 B2* | 4/2015 | Haila | H04R 17/02 381/92 |
| 9,380,384 B2* | 6/2016 | Fitzgerald | H04R 1/08 |
| 10,553,195 B2* | 2/2020 | O'Connell | G10K 11/178 |
| 2022/0225027 A1* | 7/2022 | Lesso | H04R 3/02 |

* cited by examiner

*Primary Examiner* — Disler Paul
(74) *Attorney, Agent, or Firm* — Young Basile Hanlon & MacFarlane, P.C.

(57) ABSTRACT

An image capture device reduces noise floor using multiple microphones. The image capture device includes a processor that obtains a front microphone signal from a front microphone, the front microphone signal having a noisy noise floor portion, obtains a rear microphone signal from a rear microphone, sets a splice point based on mitigation of the noisy noise floor portion relative to a speech frequency range, and combines a substantially clean noise floor portion of the rear microphone signal at or below the splice point with a remaining portion of the front microphone signal above the splice point to generate a microphone signal.

20 Claims, 12 Drawing Sheets

MULTI-MICROPHONE NOISE FLOOR MITIGATION

TECHNICAL FIELD

This disclosure relates to audio processing. In particular, this disclosure relates to establishing a microphone noise floor.

BACKGROUND

An image capture device can include multiple microphones to detect and capture audio. A microphone noise floor for the image capture device can include audible or human audible tones and artifacts. This can have an impact on image capture device performance and user experience. Methods for mitigating the effect of microphone noise floor is needed.

SUMMARY

Disclosed herein are implementations of a method and apparatus for setting a microphone noise floor.

In an aspect, an image capture device includes a front microphone. The front microphone is on a side of the image capture device including an optical component. The image capture device includes a rear microphone and a processor configured to obtain a front microphone signal from the front microphone, the front microphone signal having a noisy noise floor portion, obtain a rear microphone signal from the rear microphone, set a splice point based on mitigation of the noisy noise floor portion relative to a speech frequency range, and combine a substantially clean noise floor portion of the rear microphone signal at or below the splice point with a remaining portion of the front microphone signal above the splice point to generate a microphone signal.

In an aspect, a method includes obtaining a default microphone signal from a default microphone, wherein the default microphone has minimal diffraction effects due to a structure of an image capture device; obtaining a non-default microphone signal from a non-default microphone; frequency binning the default microphone signal; frequency binning the non-default microphone signal; selecting a defined set of bins from the frequency binned non-default microphone signal which corresponds to a noisy noise floor in the default microphone signal; and combining the defined set of bins with a remaining number of bins from the frequency binned default microphone signal to generate a microphone signal.

In an aspect, a non-transitory computer-readable medium comprises instructions, that when executed by a processor, cause the processor to set a splice frequency for a default microphone which has minimal diffraction effects due to a structure of an image capture device and a non-default microphone. The splice frequency mitigates effects of a noisy noise floor portion in an audio signal of the default microphone relative to a speech frequency range and minimizes diffraction effects from the non-default microphone. The processor is caused to combine a substantially clean noise floor portion of an audio signal of the non-default microphone signal with a remaining portion of the audio signal of the default microphone to generate a microphone signal. The substantially clean noise floor portion is at or below the splice frequency and the remaining portion is above the splice frequency.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The implementations described herein include methods and devices configured to mitigate microphone noise floor issues by combining noise floor signals from multiple microphones. Devices, such as image capture devices, may include multiple microphones on different surfaces of the device. A microphone noise floor can be associated with each microphone. A front microphone is selected as a default microphone to capture audio coming from the front without diffraction effects. Audible tones and artifacts in the front microphone noise floor can introduce unpleasant and unnatural artifacts in the recorded audio. A rear microphone noise floor is relatively clean in contrast to the front microphone. This is particularly true for a frequency range of interest. In some implementations, the frequency range of interest is below a frequency range associated with speech. That is, a splice point is based on minimizing the diffraction effects in the frequency range of speech. In implementations, the splice point may be set to minimize diffraction effects of other frequency ranges. In implementations, the splice point may be set based on measurements of the diffraction around the image capture device geometry and the placement of the microphones. Accordingly, a rear microphone audio signal corresponding with the frequency range of interest is spliced with a remaining front audio signal to generate a combined audio signal. This audio signal is then used as the default audio signal for audio processing in the image capture device.

Figure 1A:
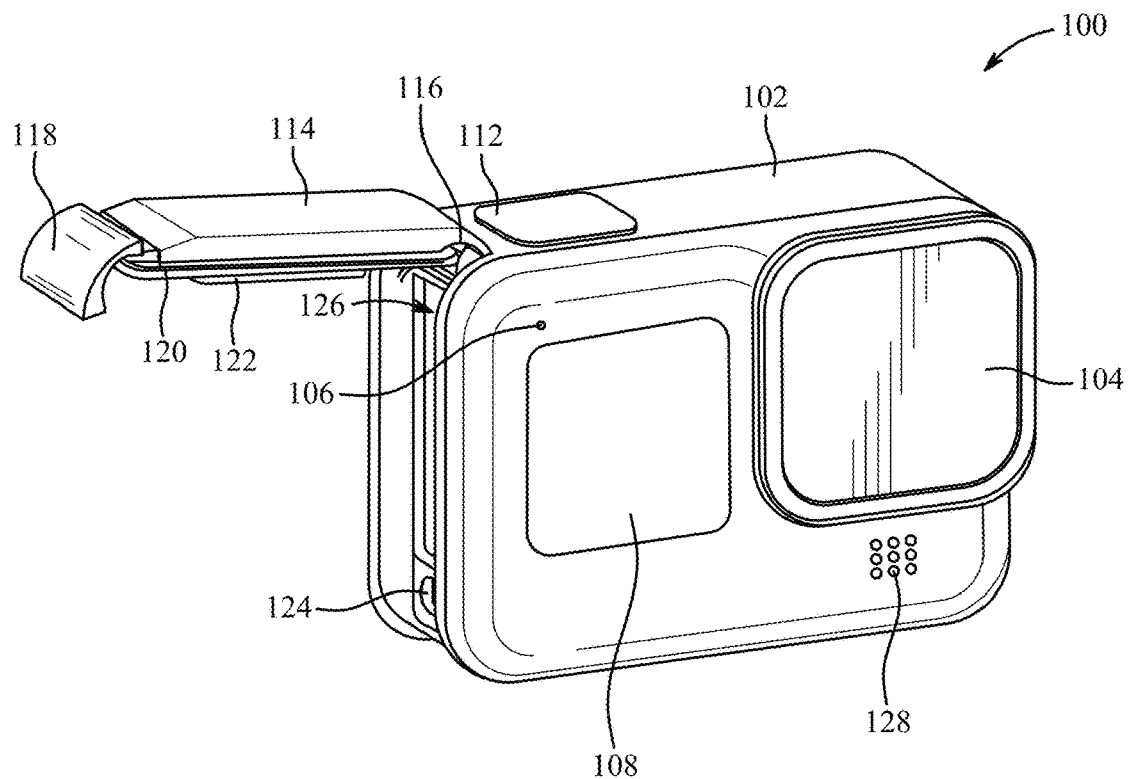
FIGS. 1A-B are isometric views of an example of an image capture device.
Figure 1B:
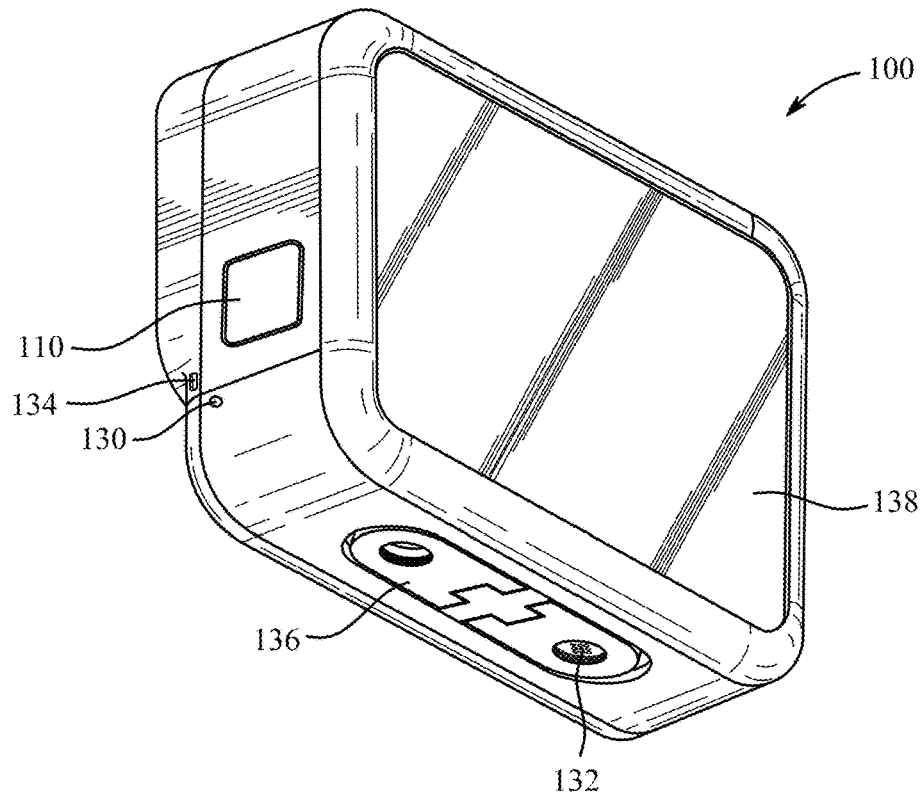

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.)

internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 7:
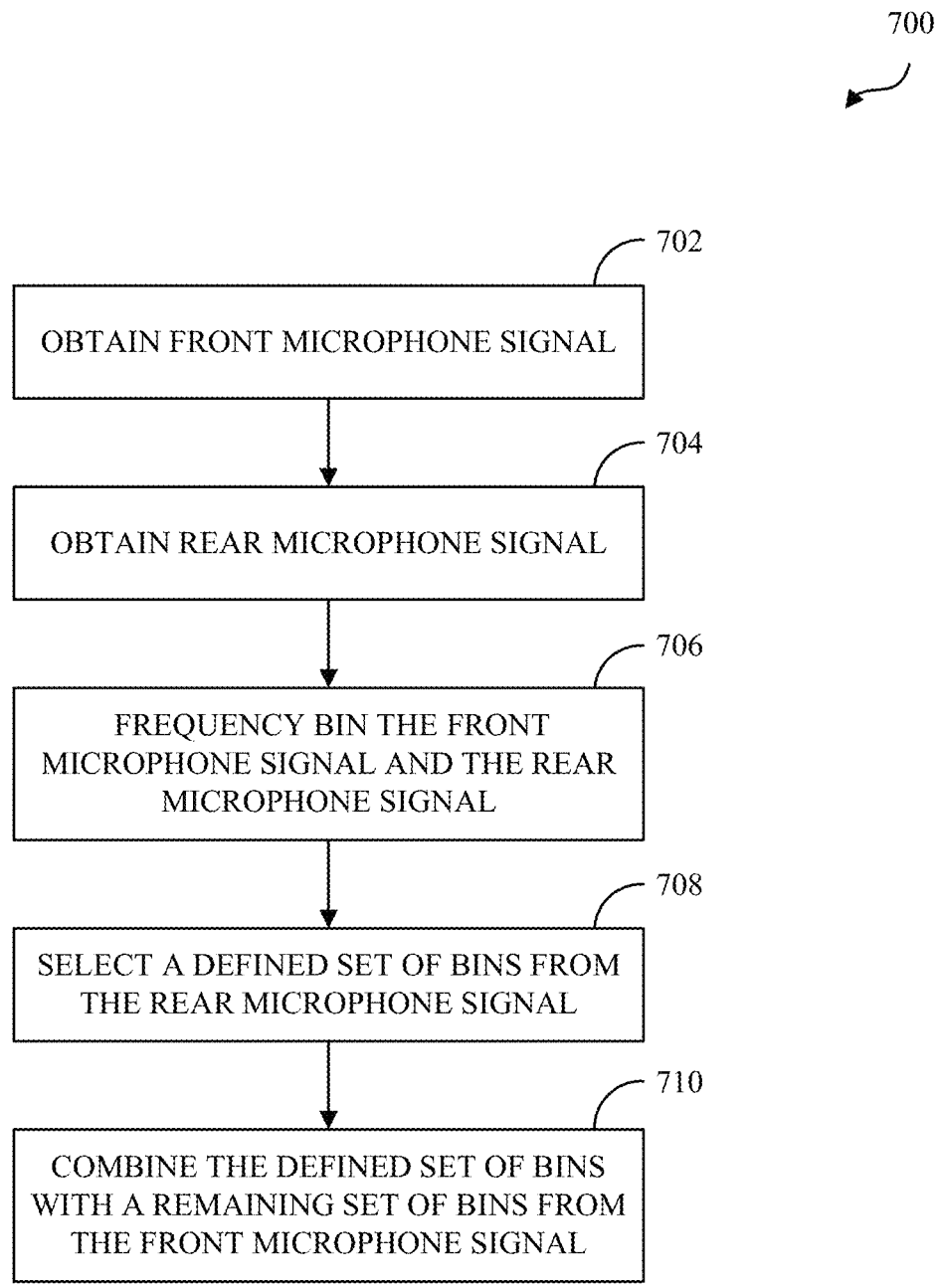
FIG. 7 is a flow diagram of an example of a method for combining audio signal signals to mitigate noise floor issues.
Figure 8:
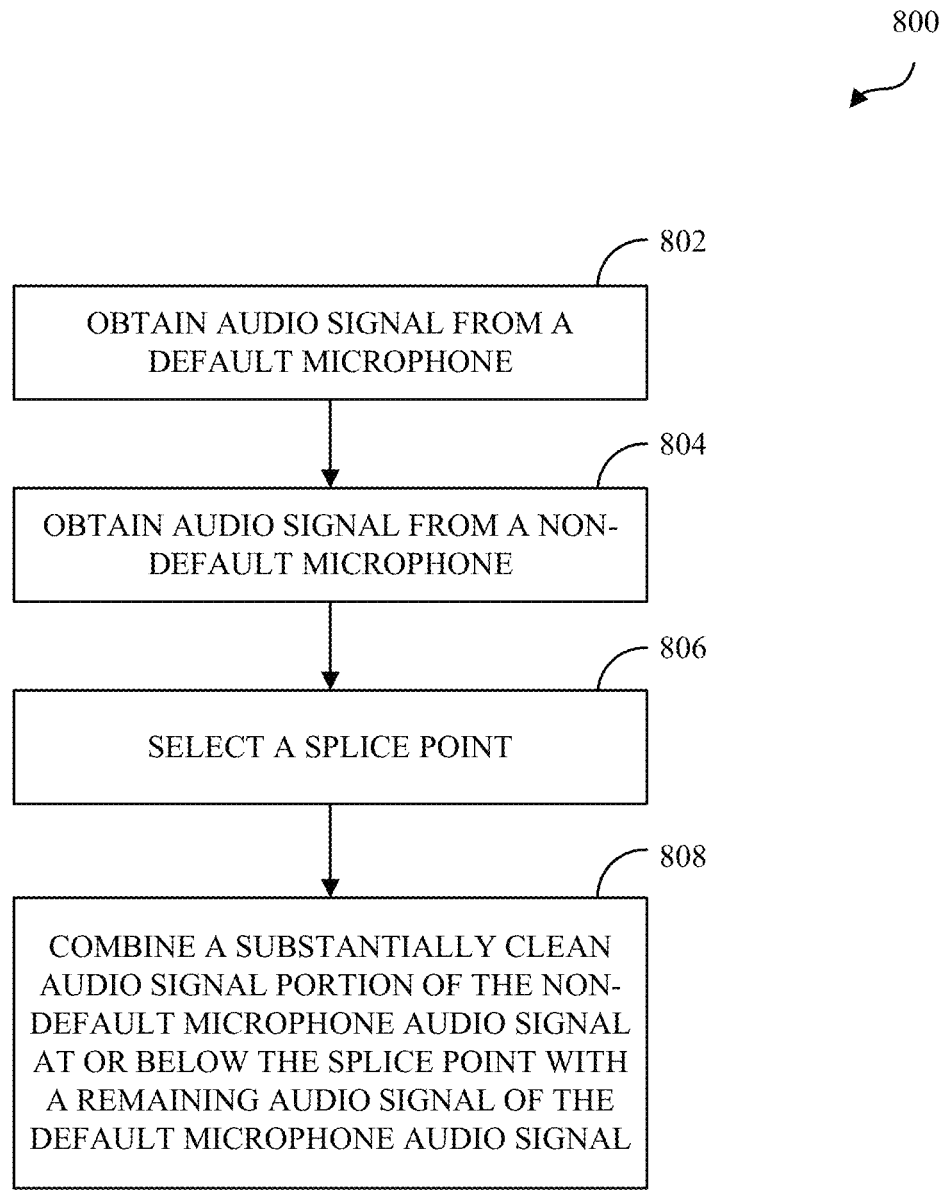
FIG. 8 is a flow diagram of an example of a method for combining audio signal signals to mitigate noise floor issues.

The image capture device 100 may be used to implement some or all of the techniques described in this disclosure, such as the method 700 described in FIG. 7, the method 800 described in FIG. 8, or combinations thereof.

Figure 2A:
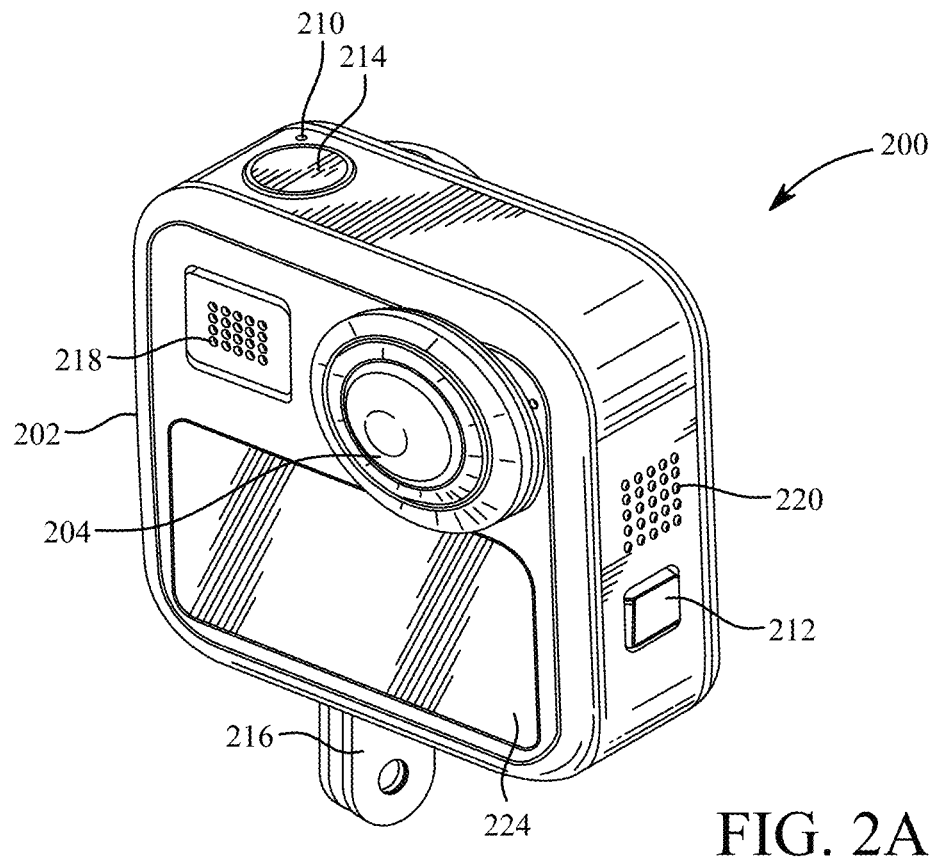
FIGS. 2A-B are isometric views of another example of an image capture device.
Figure 2B:
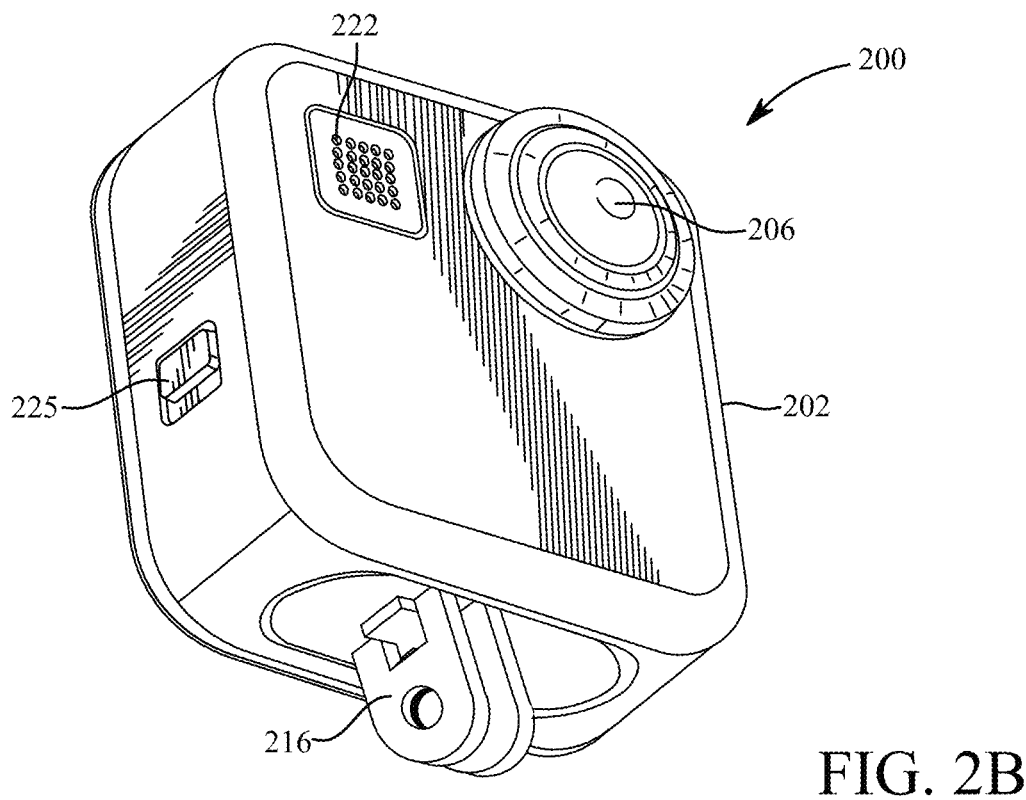

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

The image capture device 200 may be used to implement some or all of the techniques described in this disclosure, such as the method 700 described in FIG. 7, the method 800 described in FIG. 8, or combinations thereof.

Figure 2C:
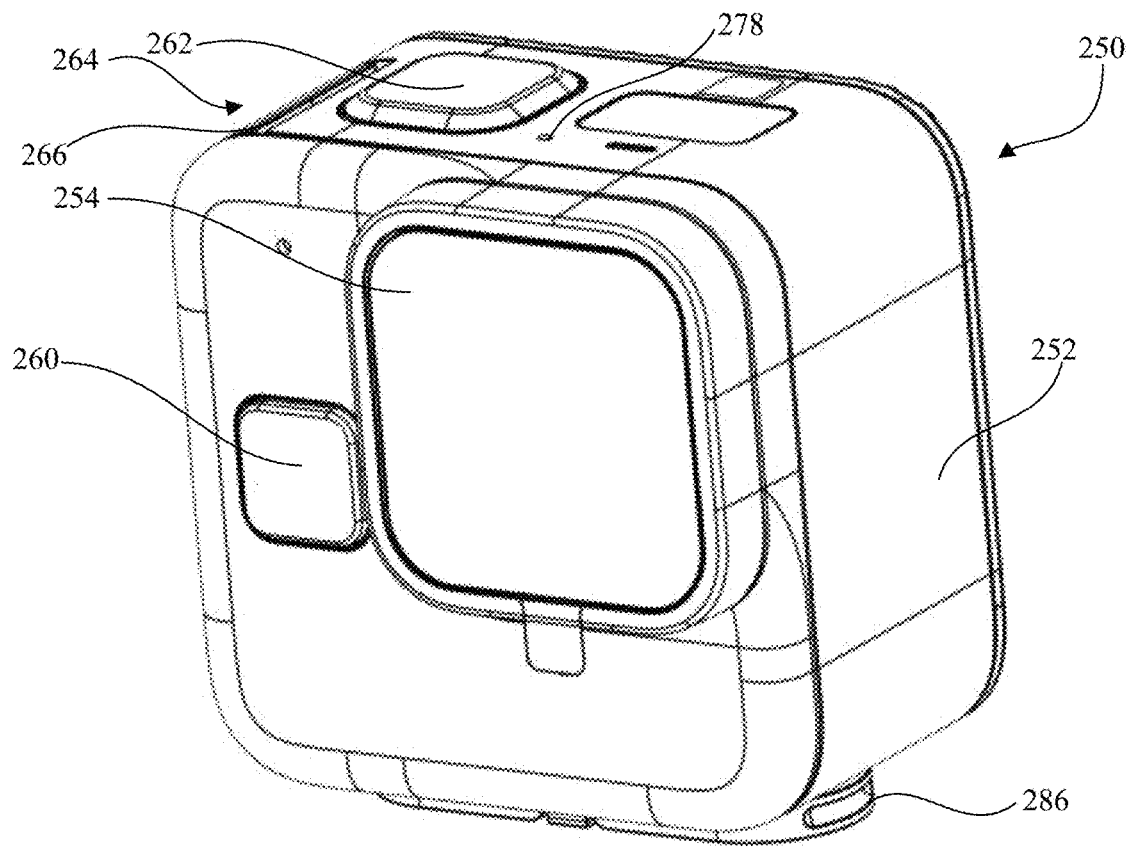
FIGS. 2C-D are isometric views of another example of an image capture device.
Figure 2D:
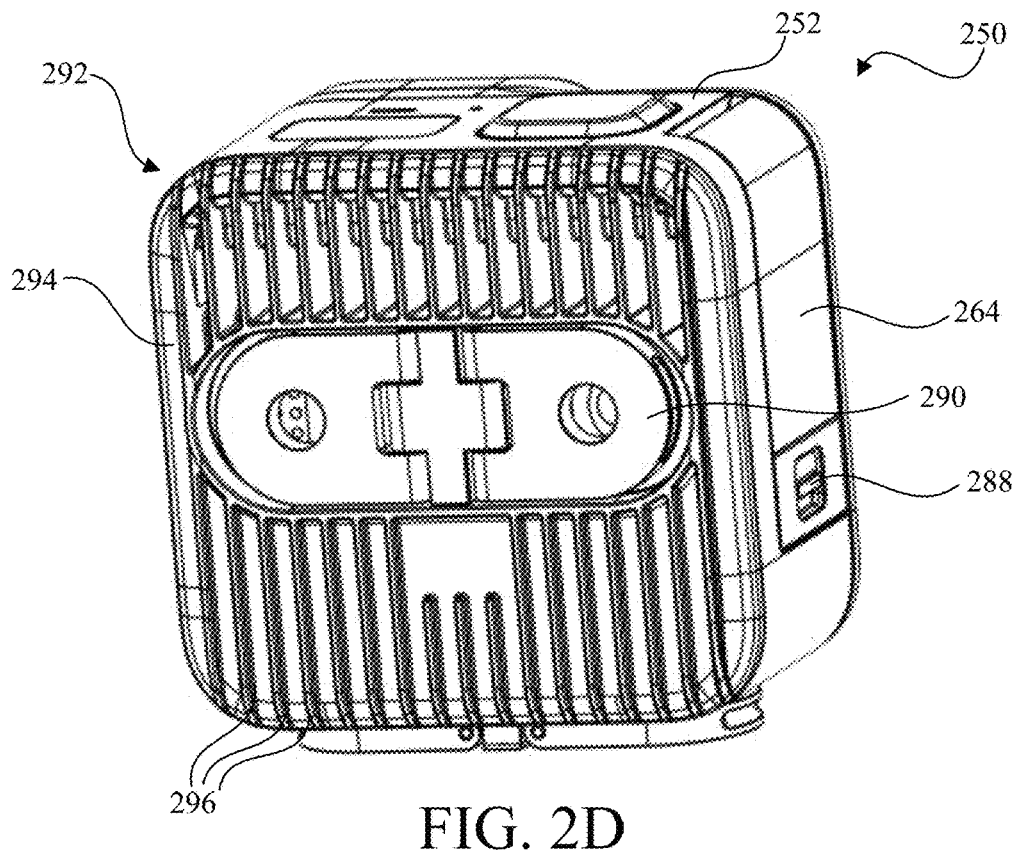

FIG. 2C is a front isometric view of an image capture device 250, the teachings of which are also applicable to the image capture devices 100, 200 of FIGS. 1A-1B and FIG. 2A-2B. The image capture device 250 includes a body 252. The body 252 forms an exterior of the image capture device 250. The body 252 is one monolithic piece including a front wall, top wall, bottom wall, first side wall, second side wall, or a combination thereof. A lens 254 extends from the body 252 so that images may be captured with the image capture device 250. The image capture device 250 may be paired to another device by a button 260.

The button 260 may be operated remotely or by contact with the button 260. The button 260 may pair the image capture device 250 with another device such as a tablet, smart device, computer, or a combination thereof. The smart device or other device may control the image capture device 250 remotely. The button 260 may enable a user to turn on near-net communications (e.g., Bluetooth). The button 260 may be used in combination with a shutter button 262 or in lieu of the shutter button 262.

The shutter button 262 may control the lens 254, image capture, or both. The shutter button 262 may operate the image capture device 250 when the shutter button 262 is depressed by a user. The shutter button 262 may be located proximate to a door 264.

The door 264 may open and close so that a user may access internal components. The door 264 may cover a charging port, a memory card, a data port, a USB port, or a combination thereof. The door 264 may be rotated open about a hinge mechanism 266. The hinge mechanism 266 and the door 264 may form a seal when closed. The door 264 may lock and prevent fluids from entering the image capture device 250.

The image capture device 250 includes a microphone 278 that captures sound while images or videos are captured. The microphone 278 may be a single microphone or may be a plurality of microphones. The microphone 278 may be located on or within the body 252 of the image capture device 250. The body 252 may include a microphone 278 and one or more interconnect mechanisms, e.g., a base interconnect mechanism 286 and a rear interconnect mechanism 290.

The one or more interconnect mechanisms 286, 290 assist in connecting the image capture device 250 to another device such as a gimbal, a stand, a tripod, a movable object, a helmet, or a combination thereof. The one or more interconnect mechanisms 286, 290 may be movable between a stored position (as shown) and a connectable position. The front of the image capture device 250 may be free of screens. For example, there may be no screen on a front of the image capture device 250 to view images or video captured by the image capture device 250. FIG. 3B is a rear isometric view of the image capture device 250 of FIG. 3A. The image capture device 250 includes a body 252. A latch mechanism 288 is located in body or housing 252 adjacent the door 264 and the latch mechanism 288 releasably holds the door 264 in place with respect to the body 252. The latch mechanism 288 is actuatable between a locked position and an unlocked position. The latch mechanism 288 slides downward to release the door 264. The door 264 and the latch mechanism 288 are located primarily on one side of the body 252. A rear interconnect mechanism 290 is located on a rear of the body 252 proximate to the latch mechanism 288.

The rear interconnect mechanism 290 is virtually identical to the base interconnect mechanism 286 of FIG. 3A. The rear interconnect mechanism 290 is movable between a stored position (as shown) and a connectable position. The rear interconnect mechanism 290 may connect the image capture device 250 to some other structure (e.g., a gimbal, a helmet, a tripod) in a different orientation than possible with the base interconnect mechanism 286. The rear interconnect mechanism 290 may be located within or connected to a rear wall 292 of the image capture device 250.

The rear wall 292 forms part of the body 252. The rear wall 292 may be a discrete part of the body 252 that is separate from the monolithic portion of the body 252. The monolithic portion of the body 252 may be made of a polymer and the rear wall 292 may be made of metal. The rear 292 may form a rear outer most portion of the body 252. The rear wall 292 may be made of or include conductive material. The rear wall 292 may be made of or include a ferrous material, steel, iron, copper, silver, nickel, aluminum, or a combination thereof. The rear wall 292 may be formed by or include a rear heatsink 294.

The rear heatsink 294 may move heat from heat generating devices within the image capture device 250 to ambient air that is located around the image capture device 250. The rear heatsink 294 may be directly or indirectly connected to internal components of the image capture device 250. The rear heatsink 294 may be solid metal. The rear heatsink 294 may be connected to the rear interconnect mechanism 290 and the rear interconnect mechanism 290 may function as part of the rear heatsink 294. The rear interconnect mechanism 290, when in the extended or connectable position (not shown), may dissipate heat, transfer heat to another device, or a combination thereof. The rear heatsink 294 may include a plurality of fins 296.

The fins 296 may project outward so that as air passes over the fins 296, heat is transferred from the image capture device 250 into the ambient air. When the image capture device 250 is in motion or subjected to moving air, the fins 296 may create turbulent flow to increase an amount of heat removed from the image capture device 250. The fins 296 may be configured such that air flowing across the fins 296 has a laminar flow or a turbulent flow so that air is heated as the air passes over the rear heatsink 294. The fins 296 may be made of a same material as the rear heatsink 294. The fins 296 may be made of a more conductive material than the rear heatsink 294. The fins 296 and the rear heatsink 294 may be one monolithic piece. The rear heatsink 294 may accept heat from one or more heat generating devices and transfer the heat into the fins 296 to release the heat. The rear heatsink 294 may be in direct or indirect contact with the heat generating devices.

The image capture device 250 may be used to implement some or all of the techniques described in this disclosure, such as the method 700 described in FIG. 7, the method 800 described in FIG. 8, or combinations thereof.

Figure 3:
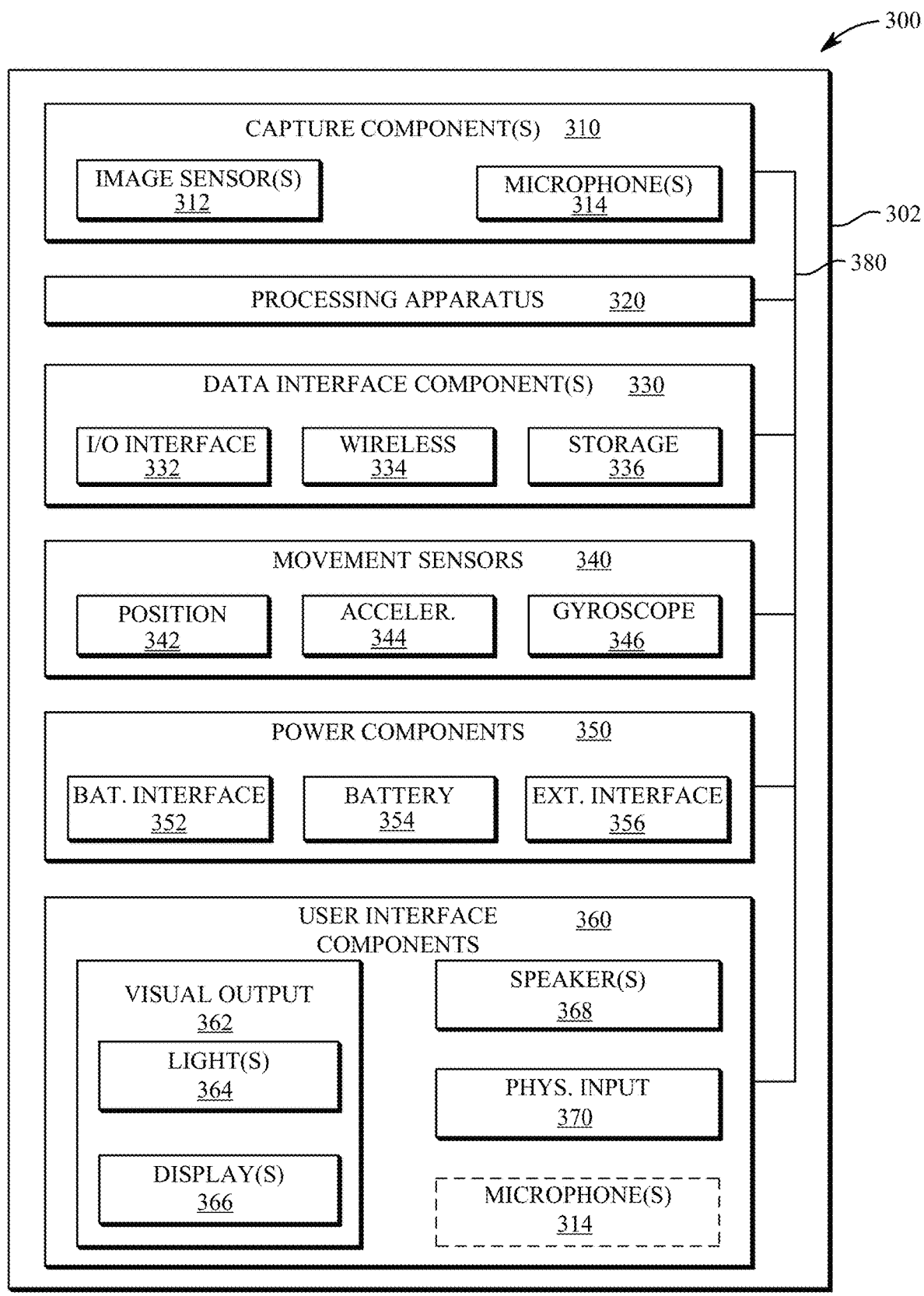
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors.

Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the method 700 described in FIG. 7, the method 800 described in FIG. 8, or combinations thereof.

Figure 4A:
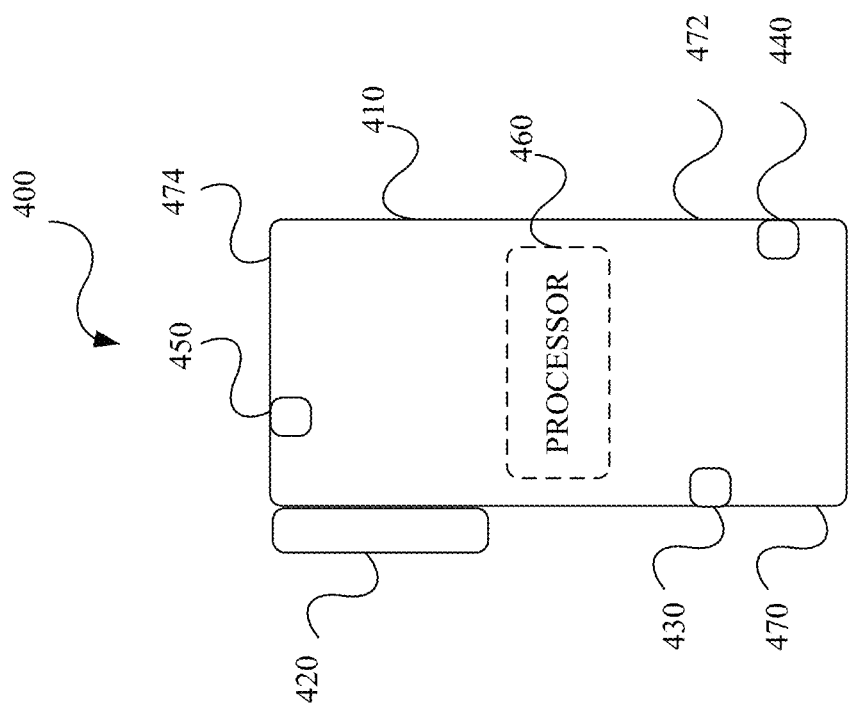
FIG. 4A is a block diagram of an example of an image capture device.

FIG. 4A is a block diagram of an example of an image capture device 400 including a body 410, one or more optical components 420 structured on the body 410, one or more microphones 430, 440, and 450 internal to and structured on the body 410, and a processor 460 internal to the body 410. The image capture device 400 may include any or all features and/or characteristics described with respect to FIGS. 1A-3. Although shown as a single element, in alternate embodiments, the number of each element may be varied without departing from the scope of the present disclosure.

The one or more optical components 420 may include any or all features and/or characteristics described with respect to FIGS. 1A-3. For example, the one or more optical components 420 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof.

The one or more microphones 430, 440, and 450 may include any or all features and/or characteristics described with respect to FIGS. 1A-3. For example, the one or more microphones 430, 440, and 450 may be microphones which may receive, sample, capture, and/or record audio data, such as sound waves which may be related to image or video data, and/or may be audio cues or commands for initiating content capture as described herein. For example, the audio data, cues, or commands may be associated with a virtual assistant system, voice-activated system, or voice-enabled system. In an implementation, the microphone 430 may be a front facing or optical components 420 facing microphone. That is, the microphone 430 is facing in the same direction as the optical components 420 or is positioned on a front surface 470. In an implementation, the microphone 440 may be positioned on a rear surface 472. In an implementation, the microphone 450 may be positioned on a top surface 474.

The processor 460 may include any or all features and/or characteristics described with respect to FIGS. 1A-3 and may be a system-on-chip, image signal processor, a controller, or combinations thereof. The processor 460 may collectively work with the one or more microphones 430, 440, and 450, and/or combinations thereof, as appropriate, to mitigate the microphone noise floor for the image capture device 400.

Figure 4B:
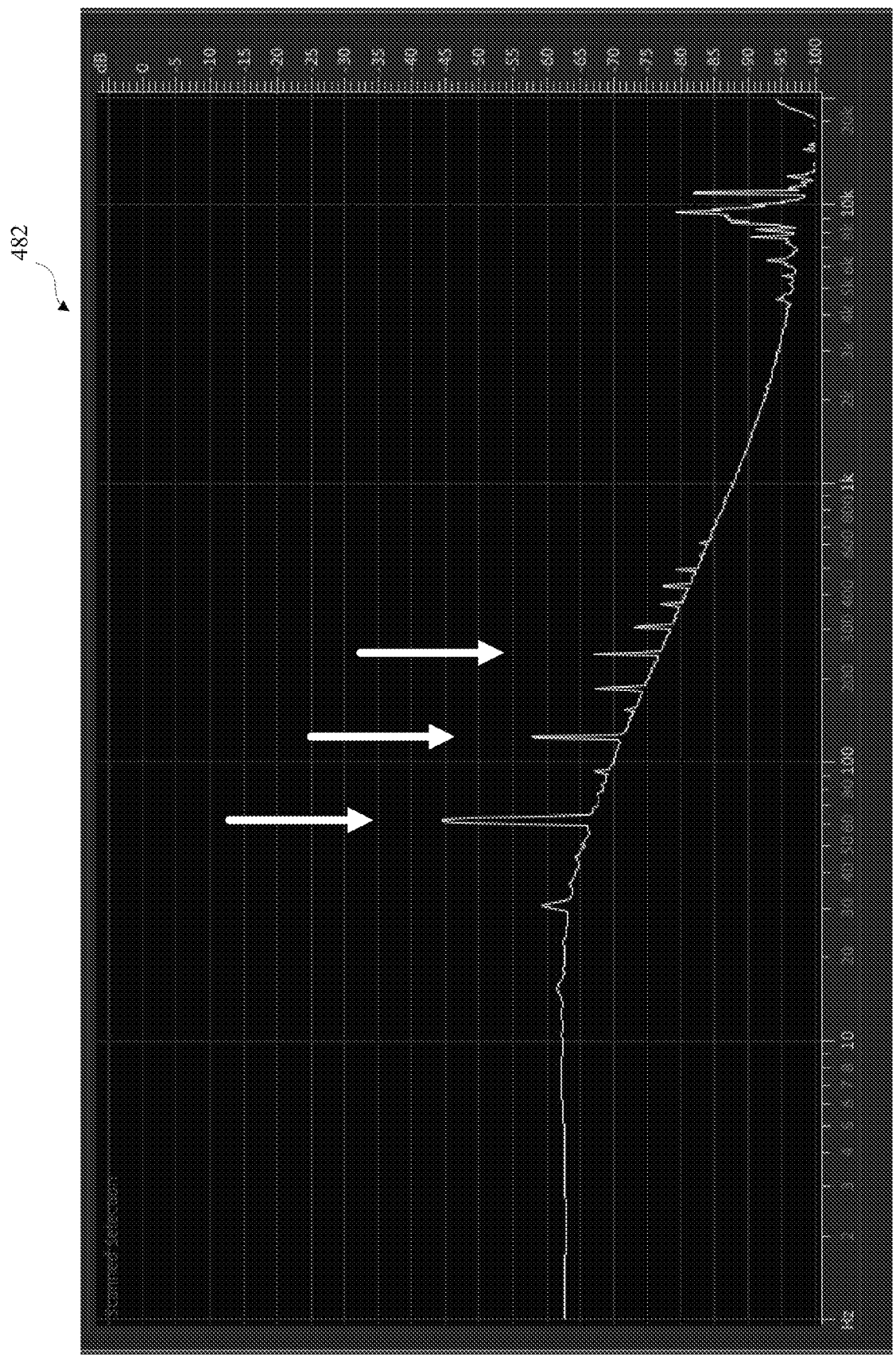
FIGS. 4B-D are diagrams of examples of spectrograms of multiple microphone signals of a device showing noise floors.
Figure 4C:
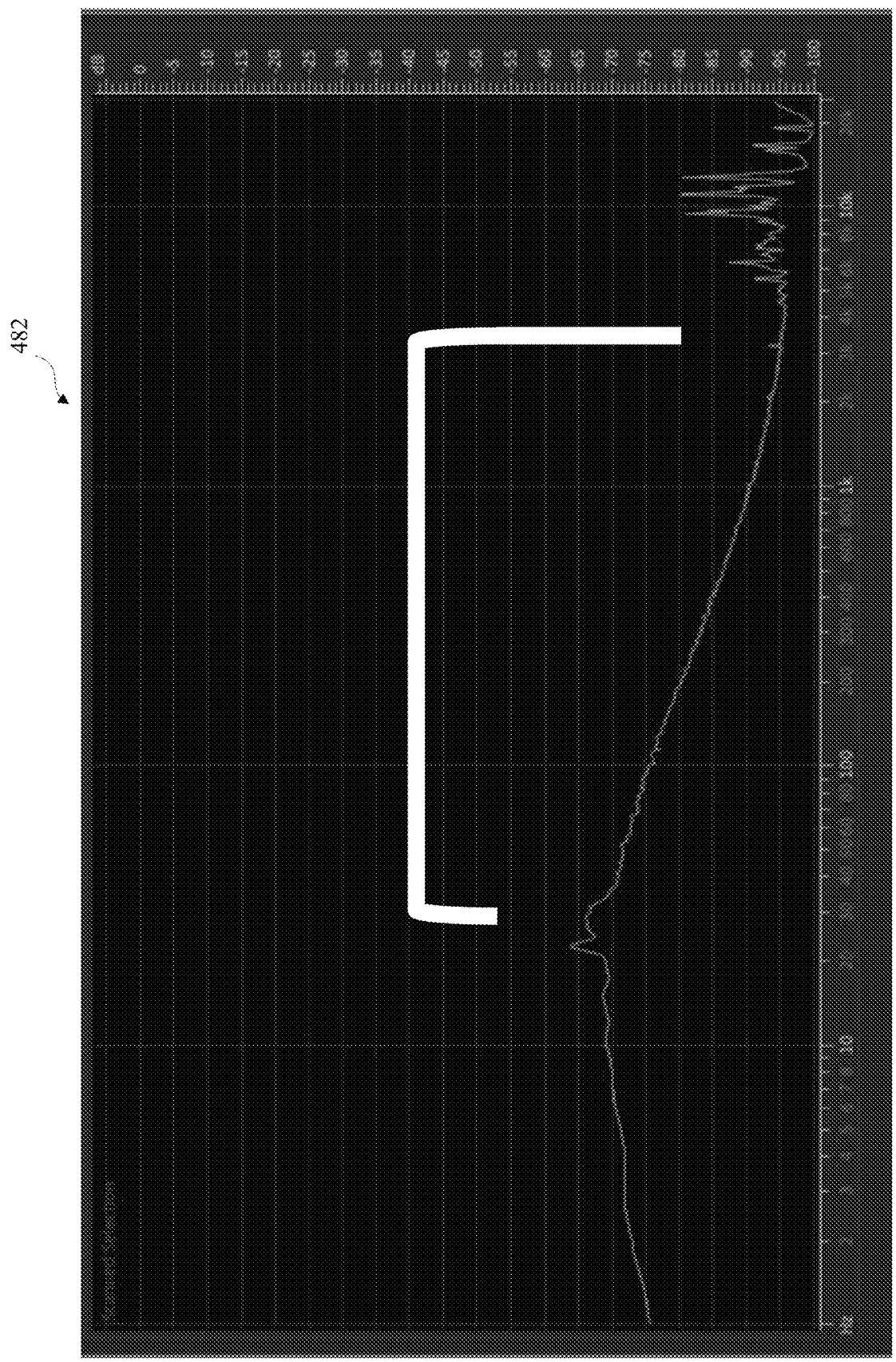
Figure 4D:
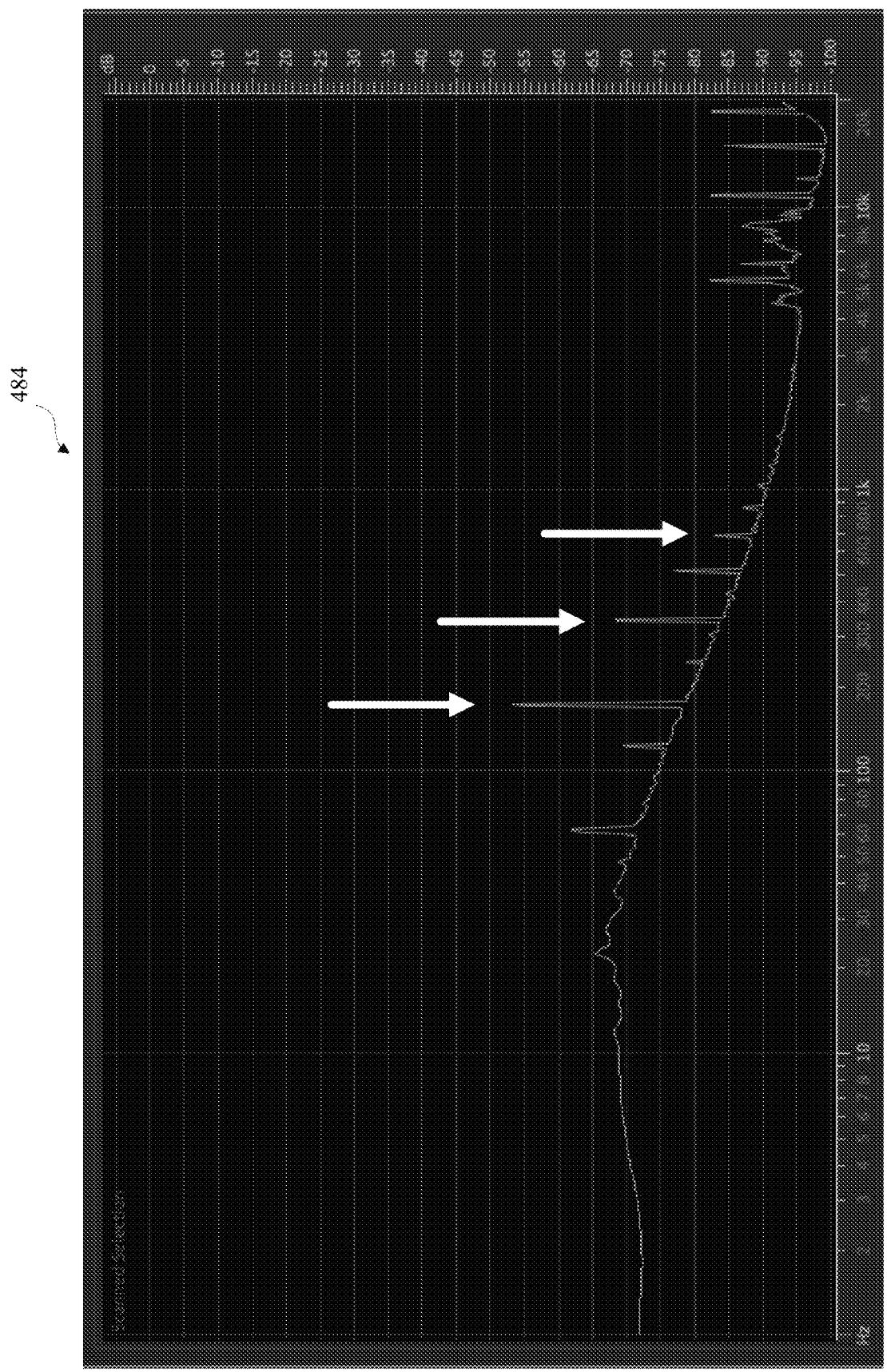

Each of the microphones 430, 440, and 450 has a microphone noise floor, which includes audible tones and artifacts. FIG. 4B is an example of a spectrogram 480 of a noise floor for the microphone 430 as a front microphone, FIG. 4C is an example of a spectrogram 482 of a noise floor for the microphone 440 as a rear microphone, and FIG. 4D is an example of a spectrogram 484 of a noise floor for the microphone 450 as a top microphone.

In FIG. 4B, amplitude spikes are shown at certain frequencies in the noise floor in the spectrogram 480. In FIG. 4C, the noise floor shown in the spectrogram 482 is relatively clean or substantially clean in contrast to the noise floor shown in the spectrogram 480. This is notably true at the frequencies or frequency range at which there are amplitude spikes in the spectrogram 480. In FIG. 4D, amplitude spikes are shown at certain frequencies in the noise floor in the spectrogram 484

For the image capture device 400, the microphone 430 (the front microphone) is set as the default microphone to capture audio coming from the front without diffraction effects and for wind processing. Diffraction effects result due to the structure and geometry of the image capture device in relation to the audio signals as they pass across the image capture device. For example, in a selfie use case, a user would be facing the microphone 430 when generating speech or other audio to be detected and recorded. In contrast, audio detected and recorded by the microphone 440 would be subject to diffraction effects based on or due to the structure of the image capture device 400. In another example, the microphone 430 is also primarily used for wind or wind noise determination and processing. Consequently, the audio signal with the relatively clean noise floor for the microphone 440 is not used as the default microphone or default audio signal or stream. However, the microphone 430 noise floor amplitude spikes fall in a speech band, which can span from approximately 200 Hz to 3,000 Hz. The audible tones and artifacts may introduce perceptible audio signals or noise in the detected and recorded audio stream, which degrades user satisfaction.

Figure 5:
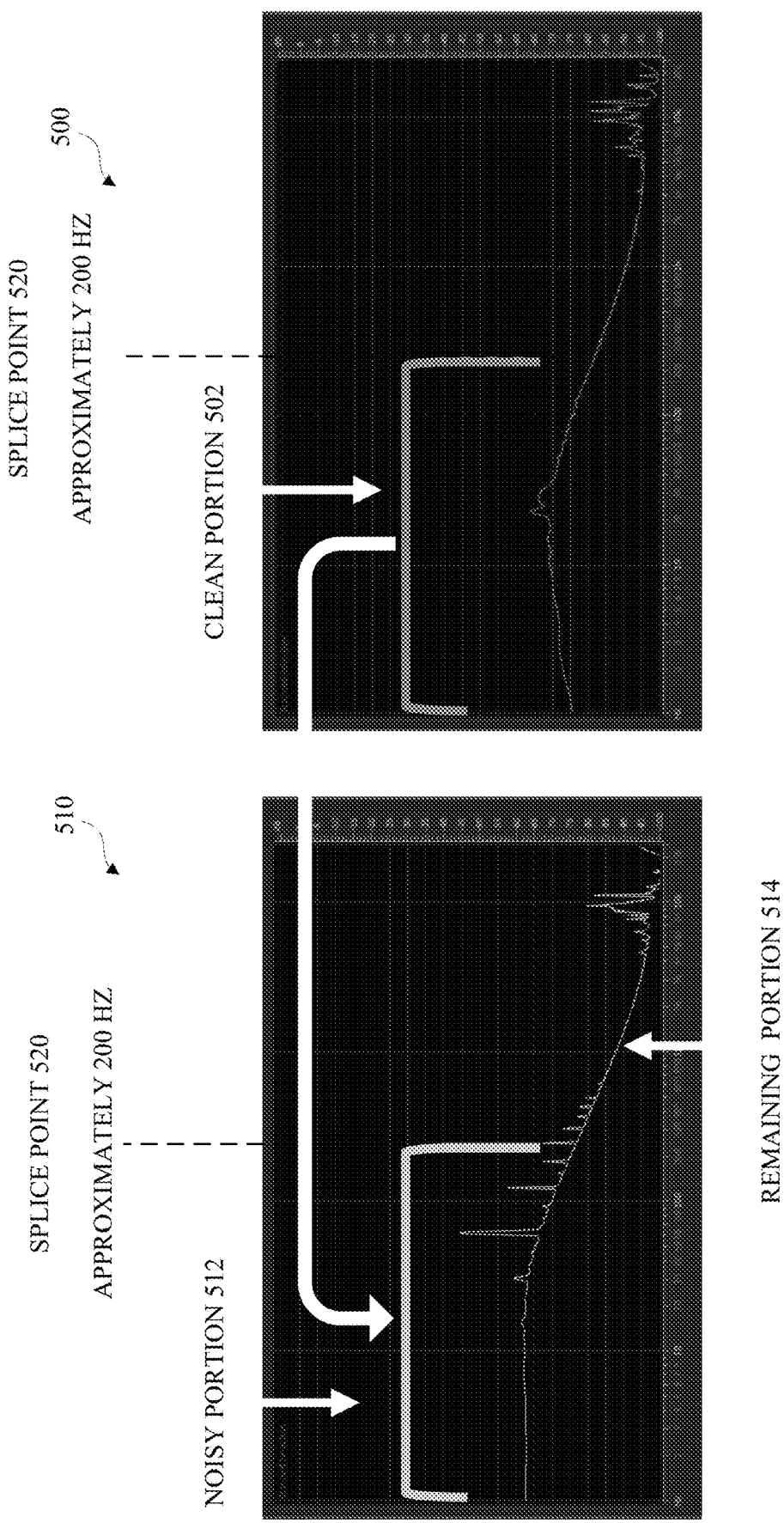
FIG. 5 is a diagram of an example of a first spectrogram and a second spectrogram to be combined.
Figure 6:
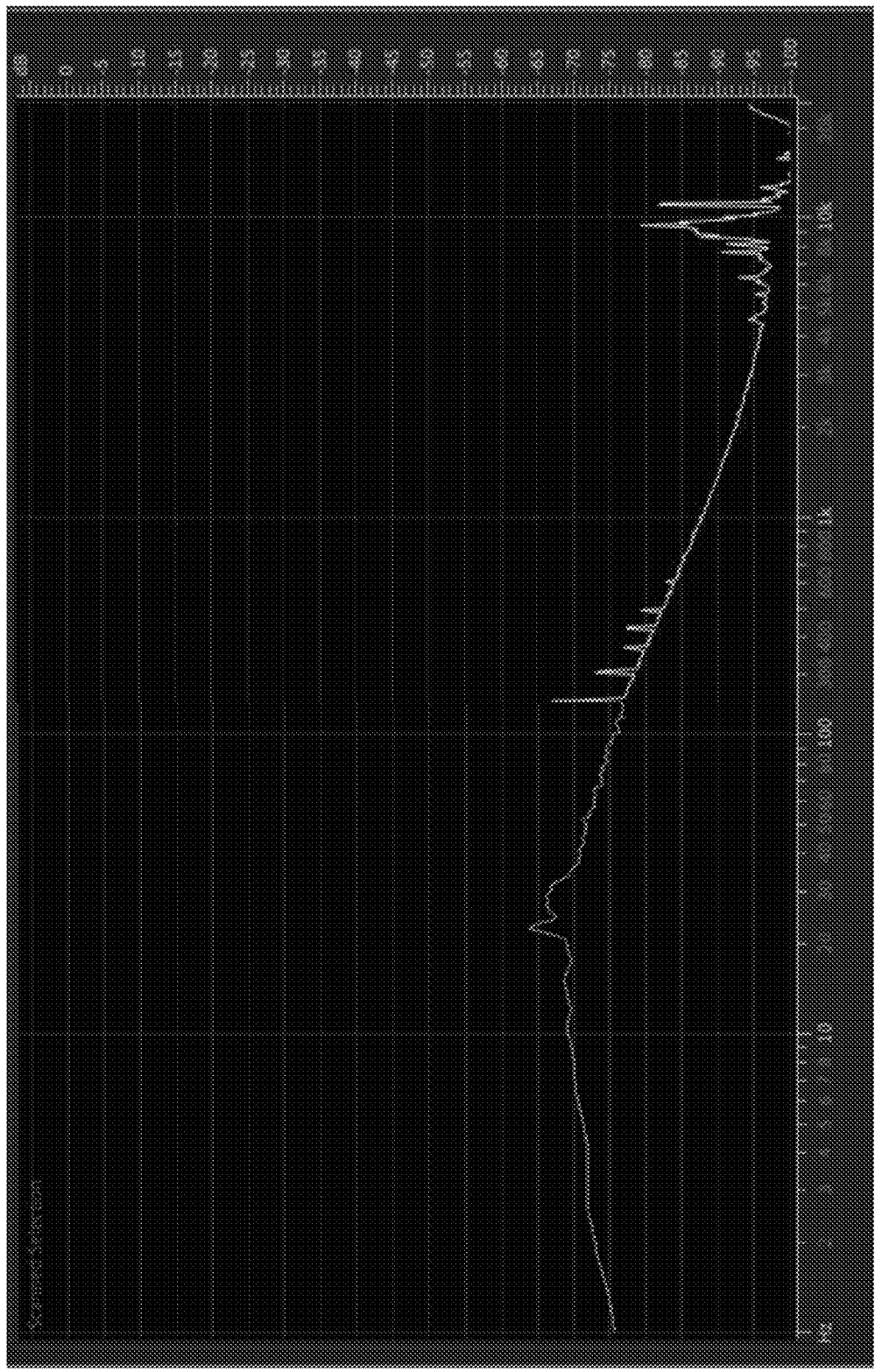
FIG. 6 is a diagram of an example of a combined spectrogram.

The methods described herein take advantage of the noise floor of the microphone 440 by replacing a noisy portion (based on the noise floor) in an audio signal of the microphone 430 with a relatively clean portion (based on the noise floor) in an audio signal of the microphone 440. FIG. 5 is a diagram of an example of a first spectrogram 500 which includes a clean portion 502 from a rear microphone and a second spectrogram 510 which includes a noisy portion 512 from a front microphone. The combined audio signal then becomes a default audio signal of the image capture device 400. FIG. 6 is a diagram of an example of a combined spectrogram 600.

In some implementations, selection of a splice point 520 is aimed at mitigating or minimizing the impact on a speech band by the noise floor from the front microphone and from use of the clean noise floor from the rear microphone. That is, the splice point is selected to minimize or mitigate the diffraction effects in or relative to the frequency range of speech. In some implementations, the splice point 520 is selected to be approximately 200 Hz. This effectively replaces a substantial portion of the noisy portion 512, which exists in a relatively low frequency band near the 200 Hz. The clean portion 502 from the rear microphone does not introduce diffraction effects as desired audio signals (i.e., non-speech signals) below the splice point 520 of 200 Hz have wavelengths which are relatively larger than a body of the image capture device. A remaining portion 514 of the second spectrogram 510 from the front microphone is retained. Any noise present in the remaining portion 514 will be masked by desired signals, i.e., speech and other sounds. The audio signal with the combined noise floor can then be used as the default audio signal (i.e., a non-windy audio signal) in contrast or in addition to an audio signal used when wind is detected (i.e., a windy audio signal). In some implementations, the splice point can be set to minimize diffraction effects of a desired or defined frequency range of interest. In some implementations, the splice point can be set based on measurement of the diffraction around the image capture device geometry and the placement of the microphones.

Operationally, the image capture device 400 can detect and capture a front microphone signal and a rear microphone signal. In implementations, the front microphone signal and the rear microphone signal are captured in the time domain at a 48 kHz sampling rate or at a block rate of 256 samples per block. The processor 460 then processes the front microphone signal and the rear microphone signal as described herein.

The captured front microphone signal and rear microphone signal are downsampled to 24 kHz. The downsampled front microphone signal and rear microphone signal are converted to the frequency domain. The frequency domain front microphone signal and rear microphone signal are frequency binned using a defined number of bins. In implementations, the number of bins is 129 bins with 93.75 Hz per bin. The frequency domain front microphone signal and rear microphone signal are calibrated by scaling the bins. Calibration can include, but is not limited to, normalization, flattening, sensitivity processing, resonance processing, and other audio signal characteristics.

A composite audio signal is generated by selecting a defined number of bins or a defined set of bins from the rear microphone signal and a remaining number of bins from the front microphone signal. In implementations, the defined number of bins is 3, namely, bins 0, 1, and 2 (i.e., the defined set of bins) from the rear microphone signal, which covers approximately a frequency range of 0-235 Hz. The rest of the composite audio signal includes bins 3-128 from the front microphone signal, which covers approximately a frequency range of 236-12000 Hz. This composite audio signal is used as the default audio signal for further frequency domain based wind processing, as appropriate. After any applicable frequency domain based wind processing, the processed default audio signal is converted back to the time domain and upsampled to 48 kHz for any remaining time domain based filtering and dynamics processing, as appropriate. This operation occurs continuously at the block rate or audio processing rate of the image capture device 400.

In implementations, a wind-based audio signal can use a different set of bins. The default audio signal and the wind-based audio signal can be processed by the processor 460 in accordance with applicable audio signal processing. In implementations, each of the default audio signal and the wind-based audio signal can be processed in parallel, as appropriate. FIG. 7 is a flow diagram of an example of a method 700 for mitigating microphone noise floor in an image capture device. The method 700 includes obtaining 702 a front microphone signal, obtaining 704 a rear microphone signal, frequency binning 706 the front microphone signal and the rear microphone signal; selecting 708 a defined set of bins from the frequency binned rear microphone signal; and combining 710 the defined set of bins with a remaining number of bins from the frequency binned front microphone signal to generate an audio signal. The method 700 may be implemented by a device, such as the image capture device 100 of FIG. 1A, the image capture device 200 of FIGS. 2A-B, the image capture device 250 of FIGS. 2C-D, the image capture device of FIG. 3, and the image capture device 400 of FIG. 4.

The method 700 includes obtaining 702 a front microphone signal and obtaining 704 a rear microphone signal. An image capture device detects and captures audio signals from at least a front microphone and a rear microphone. The audio signals are captured at an audio processing rate, block rate, or audio sampling rate. Each block is processed using the method 700. That is, the method 700 is continuous with respect to ongoing and incoming audio blocks.

The method 700 includes frequency binning 706 the front microphone signal and the rear microphone signal. The time domain front microphone signal and rear microphone signal are downsampled and converted to frequency bins in the frequency domain. Each of the frequency bins are calibrated. The number of bins can be associated with or based on the audio processing rate.

The method 700 includes selecting 708 a defined set of bins from the frequency binned rear microphone signal. A splice or combination point can be selected based on reducing the effects of a noisy noise floor of the front microphone and mitigating or minimizing diffraction effects on a speech frequency range from use of the rear microphone signal. In implementations, the splice point is approximately at a low end of the speech frequency range. In implementations, the splice point is approximately 200 Hz. Bins near or below the splice point are used from the rear microphone signal. In implementations, an upper frequency of the defined set of bins approximately corresponds to 200 Hz.

The method 700 includes combining 710 the defined set of bins with a remaining number of bins from the frequency binned front microphone signal to generate an audio signal. For a given number of frequency bins, the rest of the frequency bins for a composite audio signal is selected from the front microphone signal. The composite audio signal is set as the default audio processing signal for the image capture device.

FIG. 8 is a flow diagram of an example of a method 800 for reducing a microphone noise floor in an image capture device. The method 800 includes obtaining 802 an audio signal from a default microphone, obtaining 804 an audio signal from a non-default microphone, selecting 806 a splice point; and combining 808 a substantially clean audio signal portion of the non-default microphone audio signal at or below the splice point with a remaining audio signal of the default microphone audio signal. The method 800 may be implemented by a device, such as the image capture device 100 of FIG. 1A, the image capture device 200 of FIGS. 2A-B, 1A, the image capture device 250 of FIGS. 2C-D, the image capture device of FIG. 3, and the image capture device 400 of FIG. 4.

The method 800 includes obtaining 802 an audio signal from a default microphone and obtaining 804 an audio signal from a non-default microphone. An image capture device detects and captures audio signals from multiple microphones. One of these microphones, such as a front microphone, is designated as the default microphone for detecting and capturing audio coming from a front without diffraction effects due to the structure of the image capture device. One or more other microphones can be designated as non-default microphones, which can suffer from diffraction effects based on the structure of the image capture device. The audio signals are captured at an audio processing rate, block rate, or audio sampling rate. Each block is processed using the method 800. That is, the method 800 is continuous with respect to ongoing and incoming audio blocks.

The method 800 includes selecting 806 a splice point and combining 808 a substantially clean audio signal portion of the non-default microphone audio signal at or below the splice point with a remaining audio signal of the default microphone audio signal. In instances, a noise floor of the default microphone can include audible tones and artifacts which impact, for example, speech detected and captured at the default microphone. This portion of the audible signal of the default microphone can be identified as a noisy portion of the default microphone audio signal. In order to reduce the effects of this noisy portion, a corresponding clean portion of the non-default microphone audio signal can be used to replace the noisy portion. The corresponding clean portion is clean relative to the noisy portion of the default microphone audio signal. The frequency point (the splice point) where the two audio signals are spliced together is selected to mitigate the effects of the noisy portion on a speech frequency range in conjunction with mitigating or minimizing the introduction of diffraction effects from the use of the non-default microphone. In implementations, the splice point is approximately at a low end of the speech frequency range. In implementations, the splice point is approximately 200 Hz. The composite audio signal is set as the default audio processing signal for the image capture device.

The described methods and systems for setting a microphone noise floor can include, but is not limited to, an image capture device which includes a front microphone, a rear microphone, and a processor. The front microphone is on a side of the image capture device including an optical component. The processor is configured to obtain a front microphone signal from the front microphone, the front microphone signal having a noisy noise floor portion, obtain a rear microphone signal from the rear microphone, set a splice point based on mitigation of the noisy noise floor portion relative to a speech frequency range, and combine a substantially clean noise floor portion of the rear microphone signal at or below the splice point with a remaining portion of the front microphone signal above the splice point to generate a microphone signal.

In some implementations, the splice point is set at a low frequency end of the speech frequency range. In some implementations, the splice point is set at approximately 200 kHz. In some implementations, the splice point is set based on mitigating diffraction effects near or at the speech frequency range. In some implementations, the processor is further configured to frequency bin the front microphone signal into a defined number of bins and frequency bin the rear microphone signal into the defined number of bins, where the substantially clean noise floor portion is a defined set of bins from the defined number of bins associated with the rear microphone signal. In some implementations, the defined number of bins is based on an audio processing rate of the image capture device. In some implementations, each bin in the defined number of bins has a frequency width of 93.75 Hz. In some implementations, the substantially clean noise floor portion is substantially clean relative to the noisy noise floor portion.

The described methods and systems for setting a microphone noise floor can include, but is not limited to, a method which includes obtaining a default microphone signal from a default microphone, wherein the default microphone has minimal diffraction effects due to a structure of an image capture device, obtaining a non-default microphone signal from a non-default microphone, frequency binning the default microphone signal, frequency binning the non-default microphone signal, selecting a defined set of bins from the frequency binned non-default microphone signal which corresponds to a noisy noise floor in the default microphone signal, and combining the defined set of bins with a remaining number of bins from the frequency binned default microphone signal to generate a microphone signal.

In some implementations, the defined set of bins approximately corresponds to a low frequency end of a speech frequency range. In some implementations, an upper frequency of the defined set of bins approximately corresponds to 200 Hz. In some implementations, the defined set of bins mitigates diffraction effects relative to a speech frequency range. In some implementations, the defined set of bins minimizes diffraction effects from the non-default microphone. In some implementations, the defined set of bins is from a number of bins based on an audio processing rate of the image capture device.

The described methods and systems for setting a microphone noise floor can include, but is not limited to, a non-transitory computer-readable medium comprising instructions, that when executed by a processor, cause the processor to set a splice frequency for a default microphone which has minimal diffraction effects due to a structure of an image capture device and a non-default microphone, wherein the splice frequency mitigates effects of a noisy noise floor portion in an audio signal of the default microphone relative to a speech frequency range and minimizes diffraction effects from the non-default microphone and combine a substantially clean noise floor portion of an audio signal of the non-default microphone signal with a remaining portion of the audio signal of the default microphone to generate a microphone signal, wherein the substantially clean noise floor portion is at or below the splice frequency and the remaining portion is above the splice frequency.

In some implementations, the splice frequency is set at a low frequency end of the speech frequency range. In some implementations, the splice frequency is set at 200 Hz. In some implementations, the processor is further configured to frequency bin the audio signal from the non-default microphone into a defined number of bins and frequency bin the audio signal from the default microphone into the defined number of bins, where the substantially clean noise floor portion is a defined set of bins from the defined number of bins associated with the audio signal from the non-default microphone. In some implementations, the defined number of bins is based on an audio processing rate of the image capture device. In some implementations, each bin in the defined number of bins has a frequency width of 93.75 Hz.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
   a front microphone, wherein the front microphone is on a side of the image capture device including an optical component;
   a rear microphone located on another side of the image capture device; and
   a processor configured to:

obtain a front microphone signal from the front microphone, the front microphone signal having a noisy noise floor portion;

obtain a rear microphone signal from the rear microphone;

set a splice point based on mitigation of the noisy noise floor portion relative to a speech frequency range; and combine a substantially clean noise floor portion of the rear microphone signal at or below the splice point with a remaining portion of the front microphone signal above the splice point to generate a microphone signal.

2. The image capture device of claim 1, wherein the splice point is set at a low frequency end of the speech frequency range.

3. The image capture device of claim 1, wherein the splice point is set at approximately 200 kHz.

4. The image capture device of claim 1, wherein the splice point is set based on mitigating diffraction effects near or at the speech frequency range.

5. The image capture device of claim 1, the processor further configured to:

frequency bin the front microphone signal into a defined number of bins; and frequency bin the rear microphone signal into the defined number of bins, wherein the substantially clean noise floor portion is a defined set of bins from the defined number of bins associated with the rear microphone signal.

6. The image capture device of claim 5, wherein the defined number of bins is based on an audio processing rate of the image capture device.

7. The image capture device of claim 5, wherein each bin in the defined number of bins has a frequency width of 93.75 Hz.

8. The image capture device of claim 1, wherein the substantially clean noise floor portion is substantially clean relative to the noisy noise floor portion.

9. A method, comprising:

obtaining a default microphone signal from a default microphone, wherein the default microphone has minimal diffraction effects due to a structure of an image capture device;

obtaining a non-default microphone signal from a non-default microphone;

frequency binning the default microphone signal;

frequency binning the non-default microphone signal;

selecting a defined set of bins from the frequency binned non-default microphone signal which corresponds to a noisy noise floor in the default microphone signal; and combining the defined set of bins with a remaining number of bins from the frequency binned default microphone signal to generate a microphone signal.

10. The method of claim 9, wherein the defined set of bins approximately corresponds to a low frequency end of a speech frequency range.

11. The method of claim 9, wherein an upper frequency of the defined set of bins approximately corresponds to 200 Hz.

12. The method of claim 9, wherein the defined set of bins mitigates diffraction effects relative to a speech frequency range.

13. The method of claim 12, wherein the defined set of bins minimizes diffraction effects from the non-default microphone.

14. The method of claim 9, wherein the defined set of bins is from a number of bins based on an audio processing rate of the image capture device.

15. A non-transitory computer-readable medium comprising instructions, that when executed by a processor, cause the processor to:

set a splice frequency for a default microphone which has minimal diffraction effects due to a structure of an image capture device and a non-default microphone which has greater than the minimal diffraction effects due to a structure of an image capture device, wherein the splice frequency mitigates effects of a noisy noise floor portion in an audio signal of the default microphone relative to a speech frequency range and minimizes diffraction effects from the non-default microphone; and combine a substantially clean noise floor portion of an audio signal of the non-default microphone signal with a remaining portion of the audio signal of the default microphone to generate a microphone signal, wherein the substantially clean noise floor portion is at or below the splice frequency and the remaining portion is above the splice frequency.

16. The non-transitory computer-readable medium of claim 15, wherein the splice frequency is set at a low frequency end of the speech frequency range.

17. The non-transitory computer-readable medium of claim 15, wherein the splice frequency is set at 200 Hz.

18. The non-transitory computer-readable medium of claim 15, wherein the processor is further configured to:

frequency bin the audio signal from the non-default microphone into a defined number of bins; and frequency bin the audio signal from the default microphone into the defined number of bins, wherein the substantially clean noise floor portion is a defined set of bins from the defined number of bins associated with the audio signal from the non-default microphone.

19. The non-transitory computer-readable medium of claim 18, wherein the defined number of bins is based on an audio processing rate of the image capture device.

20. The non-transitory computer-readable medium of claim 19, wherein each bin in the defined number of bins has a frequency width of 93.75 Hz.

\* \* \* \* \*